May 20, 1924.

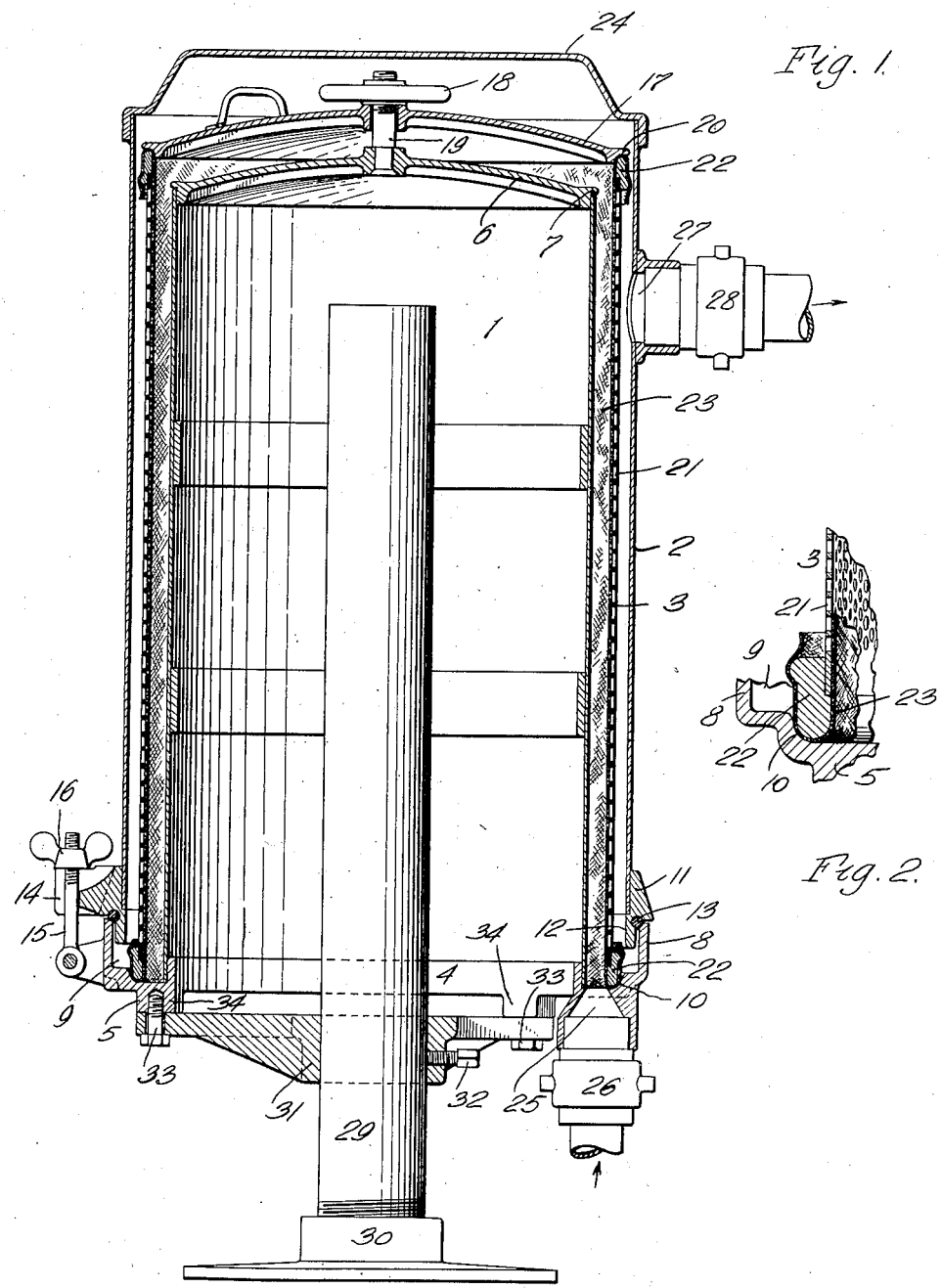

H. FELDMEIER

LIQUID FILTER

Filed March 21, 1922   2 Sheets-Sheet 2

1,494,677

INVENTOR.
Harvey Feldmeier,
by Parker & Brochure
ATTORNEYS.

Patented May 20, 1924.

1,494,677

UNITED STATES PATENT OFFICE.

HARVEY FELDMEIER, OF LITTLE FALLS, NEW YORK, ASSIGNOR TO D. H. BURRELL & CO., INC., OF LITTLE FALLS, NEW YORK.

LIQUID FILTER.

Application filed March 21, 1922. Serial No. 545,507.

*To all whom it may concern:*

Be it known that I, HARVEY FELDMEIER, a citizen of the United States, residing at Little Falls, in the county of Herkimer and State of New York, have invented a new and useful Improvement in Liquid Filters, of which the following is a specification.

This invention relates to improvements in filters of the type wherein a liquid is fed to the bottom of the filter and passes up and through a removable filter member for filtration and out through a suitable discharge opening.

The invention is particularly applicable to milk filters. In this type of filter, after a "run of milk" has been passed through the filter, that portion of the milk which is left in the container of the filter is drawn off and the filtering medium removed and a new one inserted. Frequently, however, it is necessary during a run of milk to replace the filtering medium by another one. Furthermore, in filtering milk it is necessary to frequently disassemble the filter and thoroughly scour and cleanse all the parts of the filter with which the milk comes in contact. It is, therefore, desirable that the filtering medium should be readily removable from the container and that the container itself should be capable of ready disassembly and that all of the parts with which the milk comes in contact be exposed by such disassembly to permit cleansing and inspection of the same.

It is one of the objects of this invention to produce a filter having a large filtering area to handle a maximum quantity of milk and in which at the same time the minimum quantity of liquid remains after a filtering run.

Another object of this invention is to provide means whereby a filtering medium may be quickly and readily removed for cleaning or replacement without disassembling the entire structure.

Still another object of the invention is to provide a filter which may be quickly and readily disassembled, which has the minimum of joints or parts with which the liquid contacts and in which all the parts exposed to contact with the liquid will be exposed by such disassembly and can be easily and thoroughly cleaned and inspected.

For the purpose of disclosing the invention one embodiment is illustrated in the accompanying drawings, in which:

Fig. 1 is a vertical central sectional elevation of the liquid filter assembled for use.

Fig. 2 is a fragmentary sectional view of the seal between the filter unit and the base of the filter.

Figure 3:
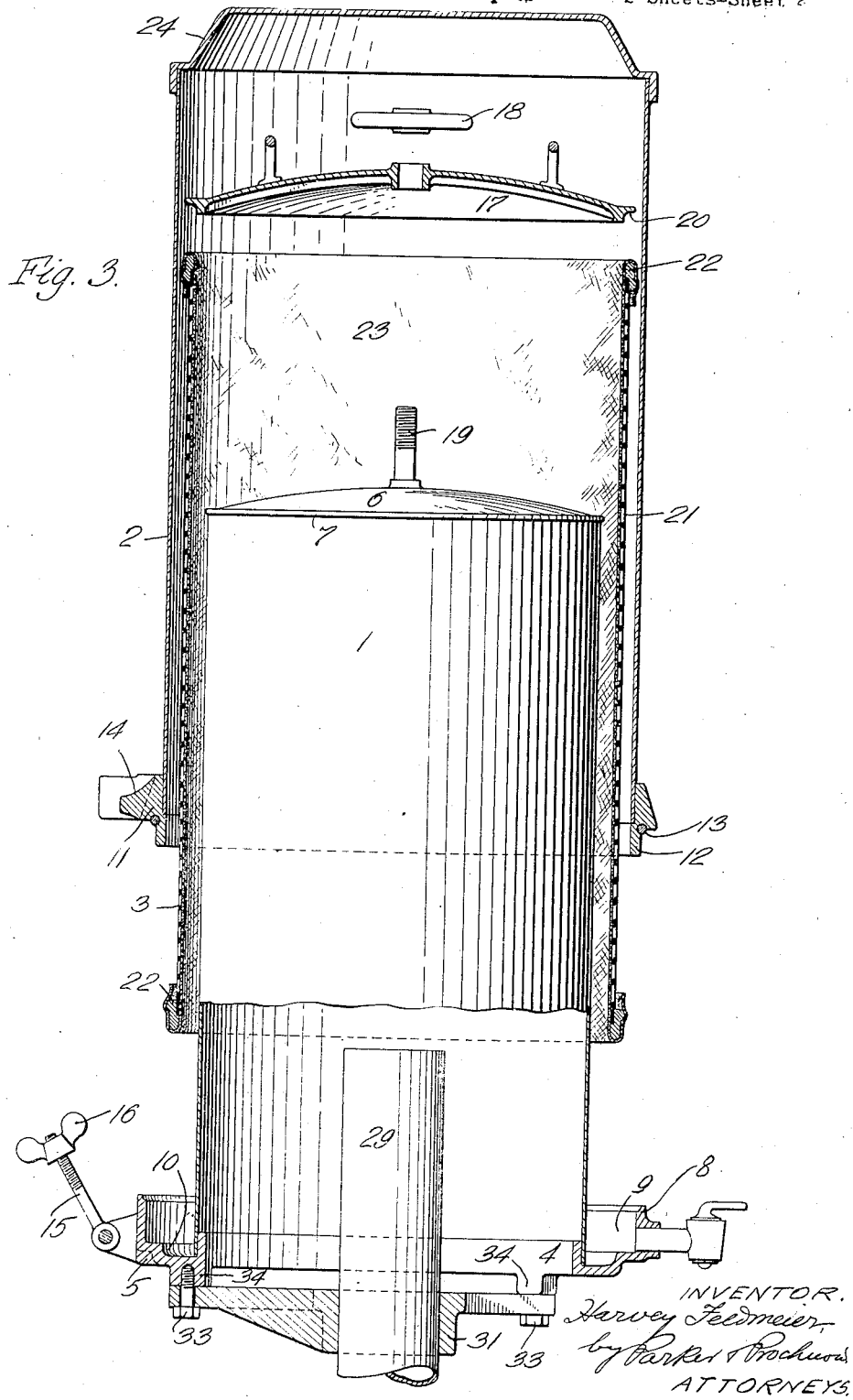
Fig. 3 is a view similar to Fig. 1, but on a different plane, and showing the parts disconnected.

In the embodiment of the invention illustrated, the two concentric, cylindrical casings 1 and 2 form between them a liquid chamber which is divided into two compartments, an inner and an outer, by the cylindrical filter unit 3 which is arranged concentrically between the casing and spaced apart from each of them. By this arrangement I am enabled to get a maximum filtering area and at the same time reduce the content area of the filter to the minimum so that after a run of liquid has taken place the minimum quantity of liquid will remain in the chamber to be drawn off. The inner cylindrical casing 1 is secured at its lower end over an inner peripheral flange 4 of a base ring 5 and is permanently secured to said ring preferably by spinning the lower end of the cylinder into an annular groove at the base of the flange. The upper end of the casing is provided with a head 6 which fits within the casing and has an annular shoulder 7 abutting against the top edge of the cylinder. This head is permanently connected to the cylinder so that the head, casing 1 and the base ring 5 form a permanently assembled unit.

The base ring 5 is provided with an outer peripheral flange 8 and between the flanges 4 and 8 there is formed an annular groove 9 which receives the lower end of the filter unit 3, an annular shoulder 10 being formed in the bottom of the groove for positioning the filter unit and spacing it from the cylindrical casings 1 and 2. The outer cylinder 2 is detachably secured to the ring 5 by means of a securing ring 11 forming the lower end of this casing. This ring 11 is permanently attached to the lower end of the cylinder 2 and is provided with a downwardly extending annular lip 12 adapted to telescope within the outer flange 8 on the base ring 5. The lower face of the ring 11 is disposed adjacent the upper edge of the flange 8, and interposed between the flange 8 and the ring 11 is a gasket 13 formed of rubber or other suitable packing material. The ring 11 is provided with a plurality of radially disposed lugs 14 which are bifurcated to receive corresponding bolts 15 hinged on the base ring 5 and provided with clamping nuts 16 which engage the top surface of the lugs and clamp the ring 11 to the base ring 5 for removably holding the outer casing 2 in position.

The filter unit 3 is adapted to be clamped in position between the base ring 5 and a head 17, which head is drawn toward the base ring by means of a clamping nut 18 mounted upon a threaded stem 19 extending through the head and secured in the head 6. This head 17 fits within the filter unit 3 and is provided with an annular flange 20 which engages the top edge of the filter unit. The filter unit comprises a cylindrical perforate screen 21 which is preferably formed of sheet metal having numerous perforations formed therein and having reinforcing bands 22 at each end, but may be formed in any other suitable manner desired. A tubular filtering medium 23 preferably formed of woven material, as cloth, is fitted within the screen 21 and has its top and bottom portions folded outwardly and over the top and bottom edges of the strainer whereby when the strainer is secured in position the filtering medium is likewise held in position and forms at the top and bottom edges a seal or gasket interposed between the base ring 5 and the lower edge of the strainer and interposed between the top edge of the strainer and the clamping head 17 so that all the liquid passing into the inner chamber, formed between the inner casing and the filter, must flow through the filter to enter the outer chamber formed between the filter and the outer casing. This outer casing 2 is provided with a suitable cover or closure member 24 whereby the filter is completely closed.

The inner compartment is supplied with liquid through a suitable port 25 communicating therewith and formed in the base ring 5. The base ring at this point is provided with a suitable pipe coupling 26 by which the filter may be connected with the supply pipe for the liquid. The outer compartment into which the milk flows through the filter from the inner compartment is provided at a point below the top of the filter with an outlet port 27 provided with a suitable coupling 28 by which it is connected with the pipe of the receiving line. By locating the outlet port below the top of the chamber an air space is provided above the milk level forming an air cushion which absorbs the pulsations of the milk pump and relieves the filter and liquid connections of vibrations, maintaining an even pressure thereon. This is an important factor particularly when using a reciprocating piston pump which causes decided pressure variations in the liquid.

The structure above described is adjustably supported on a standard 29 to permit the outlet coupling to be aligned with the receiving pipe. This standard is provided with a suitable base 30 and has adjustably secured thereon a supporting spider 31 which is held in its adjusted position by a set screw 32 and this spider is adapted to receive the base ring 5, machine screws 33 being arranged to extend through the arms of the spider and into the downwardly extending lugs 34 of the base ring.

In operation, the milk or liquid to be filtered enters the inner compartment of the filtering chamber through the port 25 and as it rises passes through the filter into the outer compartment until finally it reaches the level of the discharge port 27 and flows out through this port into the pipe of the receiving line. It will be seen that by the construction and assembly of the filter parts, these parts are rendered readily separable. In event it becomes necessary to change the filter cloth, by removing the cover of the outer casing the clamping nut 18 may be detached and the head 17 lifted off, thereby permitting the filter screen 21 and its filtering cloth 23 to be removed. This cloth is readily separated from the screen and a new one may be easily installed in position with the ends folded over the edges of the screen so that the screen and cloth as a unit may be reinserted in position. For cleaning the entire apparatus it is only necessary to disconnect the outlet coupling 28 from the receiving pipe and loosen the clamping nuts 16 after which the outer cylindrical casing 2 may be readily removed from the base ring 5 after which the filter unit 3 may be removed. These parts, being removed from the base ring, may be thoroughly cleansed and the surfaces with which the liquid comes in contact inspected to insure that no matter is left in the crevices. The filter unit and the outer casing being removed, that portion of the inner casing with which the milk or liquid comes in contact and that portion of the ring which comes in contact with the liquid may be thoroughly cleansed and likewise inspected so that the entire apparatus may be kept in a thoroughly clean and sanitary condition.

I claim as my invention:

1. In a filter the combination of a base, an inner casing having a closed upper end secured to said base, an outer casing arranged on said base concentrically with said inner casing and forming an elongated annular chamber between said casings, a perforate annular screen removably mounted in said chamber between said casings, a head bearing upon the upper end of said screen and clamping the same against the base, a tubular filter cloth supported by said perforate screen and having its ends folded over the ends of the screen to secure the cloth in place and form liquid seals at the joints between the lower end of said screen and the base and between the upper end of the screen and said clamping head, and independent means for removably clamping the outer casing against the base and forming a tight joint.

2. In a filter the combination of a base, an inner cylindrical casing secured at one end to said base, a head secured to and closing the opposite end of said casing, an outer cylindrical casing removably mounted on said base and forming an annular filtering chamber around said inner casing, a cylindrical filter unit removably mounted on said base between and concentric with said casings, a cover for said filter unit, means connected with said head for clamping said filter cover on the filter unit and clamping the filter unit on the base, independent means for clamping the outer casing on the base and forming a tight joint and liquid inlet and outlet connections with said annular chamber at opposite sides of said filter unit.

3. The combination of a base ring having an inner peripheral flange and an outer peripheral flange, an inner cylindrical casing permanently secured to said inner flange and having a closed upper end, an outer cylindrical casing having a closed upper end and having its lower edge telescoping said outer flange and provided with a shoulder arranged to rest upon the top of said flange, said casings forming between them an annular liquid chamber, a packing gasket interposed between said flange and the shoulder of said casing, clamping means for clamping said outer casing in position on said flange, a cylindrical filter unit removably supported on said base ring and interposed between said outer and inner cylindrical casings, a head closing the upper end of said filter unit, means for clamping said head and filter unit in place, and liquid inlet and outlet connections with said annular chamber at opposite sides of said filter unit.

4. The combination of a base ring having an inner peripheral flange and an outer peripheral flange, a cylindrical casing permanently secured to said inner peripheral flange, an outer cylindrical casing, a ring secured to said outer cylindrical casing and forming the lower end thereof having an annular lip telescoping the outer peripheral flange of the base ring, a resilient gasket interposed between said ring and outer flange, radial lugs formed on said ring and means mounted on said base ring for engaging said radial arms and clamping the outer casing on said base ring, and a cylindrical filter unit supported at its lower end on said base ring and arranged between said outer and inner cylindrical casings.

5. In a filter the combination of a base, a cylindrical inner casing permanently secured on said base and having a closed upper end, a cylindrical outer casing having a closed upper end and removably mounted on said base concentric with said inner casing and forming an annular liquid chamber between said casings, a cylindrical filter unit removably mounted on said base between and concentric with said casings, and dividing said chamber into inner and outer compartments, and a head connected to the upper end of said inner chamber and engaging the upper end of the filter unit to removably clamp the unit in position on the base and close the upper end of the filter unit, said base having a liquid inlet leading to the inner compartment, and said outer casing having a liquid outlet near the upper end thereof.

6. In a filter the combination of a base, an inner cylindrical casing mounted on said base and closed at its upper end, an outer cylindrical casing removably mounted on said base concentric with said inner casing and forming an annular chamber between said casings closed at its upper end, and a cylindrical filter unit removably mounted on said base concentric with said casings and dividing said chamber into inner and outer compartments, said base having an inlet port communicating directly with the lower end of the inner compartment and said outer casing having an outlet port near the upper end thereof.

HARVEY FELDMEIER.